United States Patent [19]

Marshall

[11] Patent Number: 4,718,447

[45] Date of Patent: Jan. 12, 1988

[54] APPARATUS FOR DISSOLVING A SOLID

[76] Inventor: Ralph E. Marshall, 11830 Amblewood St., Stafford, Tex. 77477

[21] Appl. No.: 42,356

[22] Filed: Apr. 24, 1987

[51] Int. Cl.⁴ .............................................. B01D 11/02

[52] U.S. Cl. ..................................... 137/268; 137/578; 422/263

[58] Field of Search ................ 137/268, 578; 422/261, 422/263, 287

[56] References Cited

U.S. PATENT DOCUMENTS

| | | | |
|---|---|---|---|
| 3,578,776 | 5/1971 | Schneider et al. | 137/268 |
| 3,807,431 | 4/1974 | Svanteson | 137/578 X |
| 3,943,960 | 3/1976 | Syrenne | 137/268 |
| 4,555,347 | 11/1985 | O'Dowd et al. | 137/268 X |

*Primary Examiner*—Alan Cohan
*Attorney, Agent, or Firm*—Arnold, White & Durkee

[57] ABSTRACT

An automatic system is disclosed for obtaining and maintaining a controlled volume of solution above a body of soluble solid in a container by the automatic addition of solvent. The apparatus includes a sensor for sensing the distance between the upper surface of the soluble solid in the container and a point on a float which floats in the solution produced by the action of the solvent on the soluble solid. Solvent is added when this distance reaches a predetermined value and solvent addition ceases when the distance increases to a second predetermined value. Most advantageously, the container will be the same one used to ship the soluble solid.

16 Claims, 5 Drawing Figures

APPARATUS FOR DISSOLVING A SOLID

BACKGROUND OF THE INVENTION

1. Field of the Invention

This invention relates generally to a system for dissolving soluble, solid phase material within a container by spraying a solvent on the solid phase material such that a given, predetermined volume of the resulting solution is formed in the container above the remaining undissolved soluble material. Most advantageously, the soluble solid (e.g., powdered detergent) will be in its original shipping container.

In the preferred embodiment, the means for introducing the solvent and actuating the flow of solvent includes a support member buoyant in relation to the solution produced by the action of the solvent on the soluble material. The support member is moveably disposed in the container above the body of the soluble material. A control valve is provided in the conduit supplying the solvent to spray means mounted on the buoyant support member. An actuator operatively couples the control valve to a device which is responsive to changes in the level of the solution produced.

2. Description of the Related Art

Various chemical feeders are known in the art. For example, U.S. Pat. No. 3,578,776 describes a chemical feeder for feeding a chemical from a solid chemical compound into a stream of water. The chemical container includes a plurality of apertures at spaced intervals about its lower end, and a nozzle extending inwardly from its lower end for flowing liquid from the upper chamber into contact with the solidifiable chemical compound and eroding the compound from its lower end. The mixture of the liquid and the chemical compound flows from the upper chamber to the lower chamber. However, with this feeder the solidifiable chemical compound must be in the form of a stick formed with a central aperture extending along its length.

U.S. Pat. No. 3,507,624 also describes a chemical feeder using jets of liquid against a solid body of material to be dissolved. The device includes a buoyant body moveable within a lower chamber in response to the level of a liquid in that chamber and a valve means responsive to motion of the buoyant body to control entry of a liquid into an upper chamber and a second valve responsive to motion of the buoyant body to control discharge of liquid from the lower chamber.

U.S. Pat. No. 3,430,823 relates to a form of liquid dispensing system providing for an automatic intermittent discharge of a treated water stream, or other liquid, for use as an additive to recirculating water systems and the like.

U.S. Pat. No. 3,323,539 describes another chemical feeding device wherein sticks of solid chlorine compound are positioned within tubes within the device. Each of the solid chlorine-compound receiving tubes is mounted over and surrounds a group of discharge ports extending through the transverse wall to the outlet chamber. Adjacent the lower end of each tube is series of circumferentially spaced jet ports for directing jet streams of water for impingement against the lower end of a solid chlorine-compound stick.

U.S. Pat. No. 3,227,524 describes a brine generator wherein a block of salt is supported at a distance above the bottom of a tank which is slightly below the level of water maintained by a float valve mechanism. The water is therefore afforded access to the salt substantially along the bottom surface of the block.

U.S. Pat. No. 3,062,228 describes methods and apparatus for controlling the liquid level in a wet storage system for soluble material. The apparatus includes control means communicating with the solvent inlet means for controlling the amount of liquid accumulated within a chamber whereby the liquid level remains at a substantially uniform distance from the top surface of the submerged mass of soluble material.

U.S. Pat. No. 2,576,315 describes an apparatus for preparing solutions of soluble solids such as aqueous solutions of salts, or brines, of predetermined concentrations. A preliminary solution of the solid is produced by contacting the solid with a continuous stream of a solvent therefor. The ultimately desired concentration is obtained by introducing a stream of fresh solvent into the preliminary solution and controlling the relative volumes or rates of the solution formed and of the solvent stream.

U.S. Pat. No. 3,574,559 describes a brine system having a brine valve and spray system with a control valve arrangement which measures a pre-selected amount of brine draw and brine tank refill. A spray head is used to distribute refill water evenly over a salt bed. Water spraying over the salt picks up brine as it passes through the salt to the bottom of the brine tank. The salt bed is retained on a conventional salt platform in the tank.

U.S. Pat. No. 2,802,724 describes a combined dry chemical dissolver and feeder. A weight disk assembly comprising a weight disk and perforated plate rests on the material which has been loaded into the tank and is to be dissolved and fed out of the tank. Water or other solvent under pressure is introduced through an inlet and passes through the perforations in the plate and comes into contact with the dry chemicals and dissolves them. The weight of the weight disk assembly causes descent of the assembly as the top surface of the chemicals dissolves.

U.S. Pat. No. 3,612,080 describes a chemical feeder for adding chemicals from a solid chemical compound into a body of water. The apparatus includes a tubular container for receiving a solidified chemical compound. Like the apparatus described in U.S. Pat. No. 3,578,776, the body of solidified chemical compound to be dissolved must be formed into a cylindrical configuration with a central opening extending throughout its length.

In all these devices, the material to be dissolved must be transferred from the container in which it is supplied to the dissolving apparatus. In some of the devices, the solid must be in a certain configuration. It is an object of the present invention to provide an apparatus which is capable of automatically dissolving a solid material in the container in which it is supplied.

SUMMARY OF THE INVENTION

The present invention comprises a system for obtaining by the automatic addition of solvent a solution of a soluble solid and for maintaining a controlled volume of that solution above the soluble solid in a container. The solid which becomes the solute in the automatically produced solution must have a specific gravity greater than one if the solvent is water. This ensures that the undissolved solid will remain at the bottom of the container.

The system comprises a float which fits within the container containing the solid to be dissolved; a solvent inlet mounted on the float for admitting solvent to the underside of the float; a solution outlet also mounted on the float for withdrawing the solution on which the float is floating, which solution was produced by the action of the solvent on the soluble solid; a means for sensing the distance between the upper surface of the soluble solid in the container and the float; and valve means responsive to the sensing means for admitting solvent through the solvent inlet from a remote solvent supply so as to maintain, between predetermined limits, the distance between the float and the submerged surface of the soluble solid in the container. The sensing means may be connected to the valve means either mechanically or electrically.

DESCRIPTION OF THE PREFERRED EMBODIMENT

Figure 1:
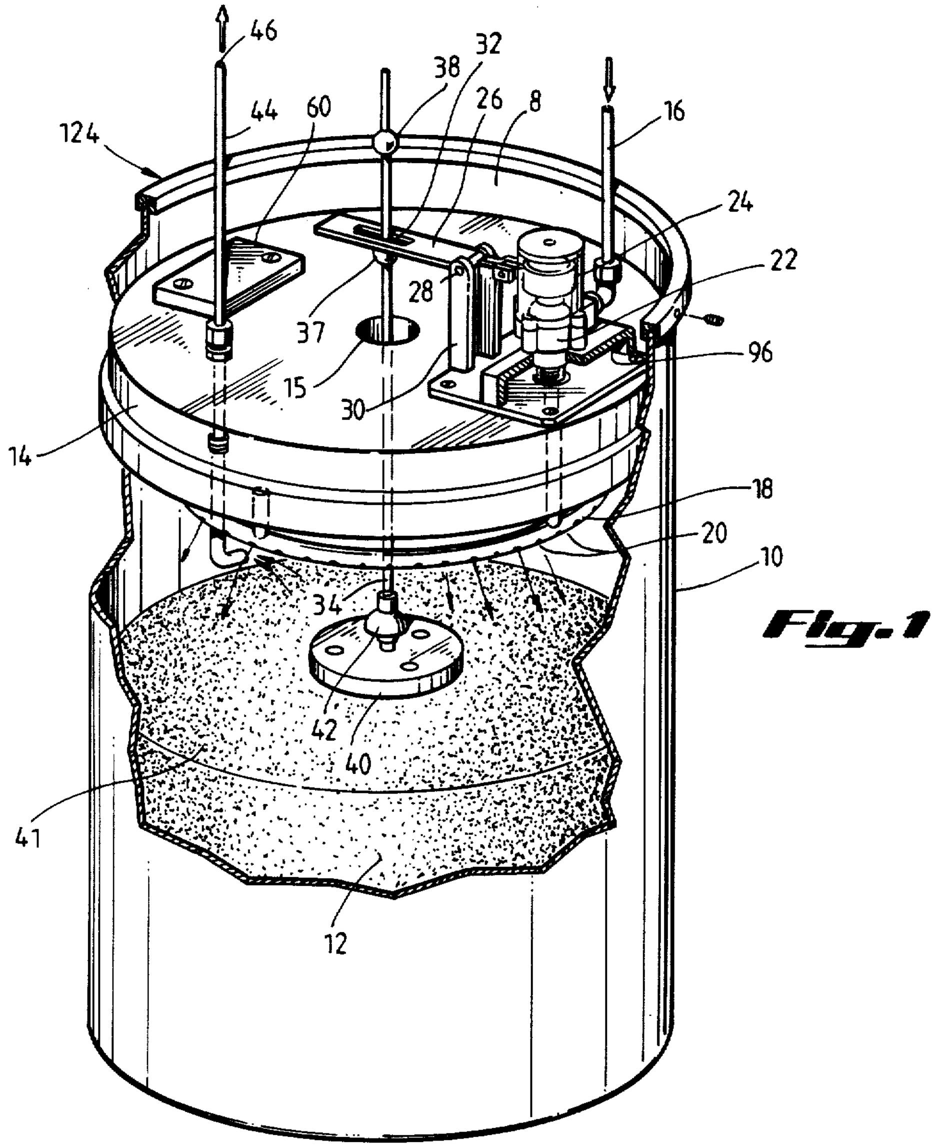
FIG. 1 is a perspective view of a preferred embodiment of the system for dissolving a solid, the apparatus being shown as it would be normally used in the shipping container holding the solid to be dissolved.

In the drawings there is shown a preferred embodiment of a system 8 for liquefying or dissolving a body of a solid soluble material in place in a container 10. It is a particular advantage of the invention that it is useful directly in the container used to ship the material, which material may be in solid, powder, granular, or paste form. The solid material will hereinafter be referred to as a solid detergent 12, but it will be understood that the invention is not in any way limited to detergents. For example, the solid could equally well be calcium hypochlorite, the solution produced being used to disinfect a swimming pool, hot tub, spa or the like, or any other solid which can be dissolved in a suitable solvent. Container 10 is typically a cylindrical drum which, during shipment and while in storage, is sealed by a cover (not shown).

In the preferred embodiment shown in the drawings, the dissolving system 8 comprises a support or float 14 which is buoyant in relation to the solvent and liquid solution produced by the action of the solvent on the solid. Float 14 is moveably disposed inside container 10 above the body of solid detergent 12. Float 14 can be made of any suitable lightweight material such as styrofoam or lightweight wood. Alternatively, it can comprise a hollow metallic or plastic compartment of sufficient displacement to support the float and its associated components in the solution produced.

A solvent conduit means is provided which includes inlet 16 coupled to spray ring 18 through valve means 22. Ring 18 has a plurality of circumferentially placed holes 20 for discharging the solvent in jets. Alternatively, spray heads similar in principle to that used in a shower bath could be substituted for spray ring 18. Valve 22 is a normally closed, magnetically actuated valve.

Figure 4:
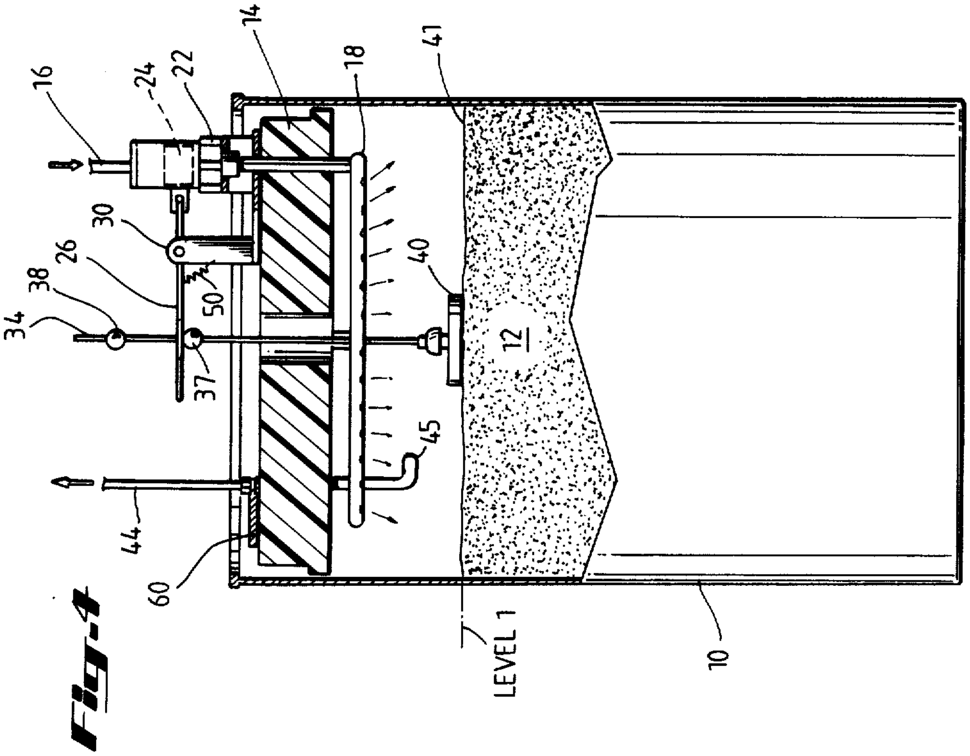
FIG. 4 is a cross-sectional view of the embodiment of FIGS. 1-3 as positioned in a container of solid to be dissolved, the inlet valve being shown in the open position.

The valve actuator means includes permanent magnet 24 mounted at one end of lever arm 26 which is pivotally supported on pivot 28 which in turn is mounted on a pair of posts 30. Lever arm 26 defines, at its opposite end, a longitudinal slot 32 through which vertically extends actuator rod 34. The upper end of rod 34 is provided, on opposite sides to slot 32, with balls 37 and 38. The balls are adjustably secured to rod 34 to allow adjustment in their vertical position on rod 34 which passes through a center opening 15 in float 14. Ball joint 42 pivotally secures foot plate 40 to the lowermost end of rod 34. Foot plate 40 maintains the position of rod 34 (and balls 37 and 38) and is of sufficient weight to overcome the attraction of magnet 24 to the armature of valve 22. On the other hand, the weight of foot plate 40 should not be such as to cause it to appreciably dig into the upper surface of solid 12 even when the solid is wet. If an optional bias means including spring 50 (FIG. 4) is employed, then the weight of foot plate 40 may be considerably reduced. As shown in FIG. 4, spring 50 overcomes any tendency of lever arm 26, to remain in the clockwise, or valve open position due to friction, etc.

A suitable counterweight 60 can be secured to the upper surface of float 14 to counterbalance the valve means and therefore allow the float to assume and maintain a level position as it floats in the solution formed.

Typically, the diameter of float 14 is only slightly less than the inner diameter of container 10 so that the inner wall of the container restrains the rotation of the float relative to a horizontal axis. The walls of the float will be lubricated by the solution produced thereby reducing any friction between the float and the container. Optionally, the upper rim of container 10 may be provided with detachable ring 124 which can be secured to container 10 with set screws or the like as illustrated in FIG. 1 so as to prevent float 14 from floating out of the container if the solution level rises above the rim of the container.

Outlet means are provided for withdrawing the detergent solution produced from under float 14 to a utilization device (not shown). The withdrawing means may be a suitable outlet conduit 44 having an inlet 45 and an outlet 46 adapted to be coupled to the utilization device, such as a pumping or suction device. In a typical situation, the utilization device might be a dishwasher equipped with an aspirator-type detergent inlet.

Figure 5:
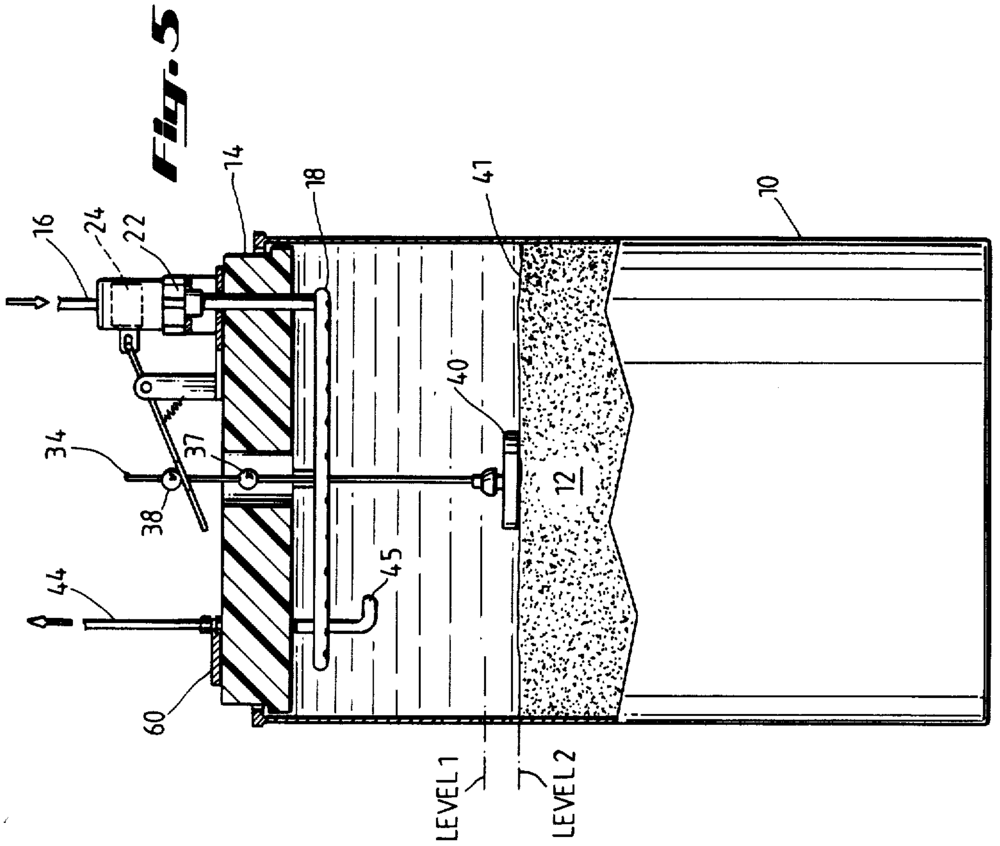
FIG. 5 is a cross-sectional view of the embodiment of FIG. 4, the inlet valve being shown in the closed position.

The operation of system 8 of the present invention will now be described with particular reference to FIGS. 4 and 5. Initially, shipping container 10 contains a volume of solid 12 up to Level 1. When it is desired to produce a detergent solution in container 10, the cover of the container (not shown) is removed and system 8 is lowered into the container. A source of solvent (commonly water) under pressure is coupled to inlet conduit 16 and the utilization device (such as a dishwasher) is connected to outlet conduit 44. Thereafter the operation of the system will be automatically controlled without human intervention until substantially the entire volume of detergent 12 in container 10 has been dissolved.

When system 8 is lowered into container 10 and foot plate 40 establishes contact with the upper surface 41 of the detergent in the container, lower ball 37 will engage lever arm 26 and rotate it on pivot 28 in a clockwise direction (as viewed in the Figures) until magnet 24 comes to rest in the valve-on position. This causes valve 22 to open thereby admitting solvent from inlet line 16 to spray ring 18. The ring is preferably annular in shape and the solvent coming from holes 20 is evenly distributed over upper surface 41 of the detergent. Inasmuch as float 14 is buoyant in relation to the solvent, the float moves upwardly and foot plate 40 moves relatively downward to Level 2 as the detergent dissolves in the body of solvent between surface 41 and float 14.

The upward movement of float 14 relative to foot plate 40 (or the downward movement of foot plate 40 relative to float 14) will bring upper ball 38 into engagement with level arm 26 causing rotation of lever arm 26 in the counterclockwise direction (as viewed in the Figures) thereby moving magnet 24 to the valve off position. Valve 22 thus returns to its normally-closed position and the spray of water (or other solvent) from ring 18 stops. Thereafter, Level 2 drops somewhat as additional detergent dissolves in the water and the solution becomes saturated.

This completes one full cycle of operation of the system 8. Valve 22 will remain closed until a sufficient amount of the liquid detergent is withdrawn via outlet line 44. When the solution level in container 10 drops sufficiently for lower ball 37 to engage lever arm 26 and move magnet 24 into the valve-on position, additional solvent will be admitted so as to maintain a relatively constant volume of solution over solid 12. The distance between lower ball 37 and upper ball 38 on actuator rod 34 defines a "dead zone" in which the volume of solution can vary without causing valve actuation. Most preferably, valve 22 is of the binary type—either full on or full off. In this way the pressure of the solvent exiting from the spray jets is always available to cause turbulence in the solution thereby increasing the rate of dissolution of the detergent.

System 8 for dissolving solid 12 causes valve 22 to open and close in response to changes in the level of detergent solution within the container until nearly the entire volume is consumed. Thereafter, the system can be removed from container 10 and placed in a fresh container of detergent.

Figure 2:
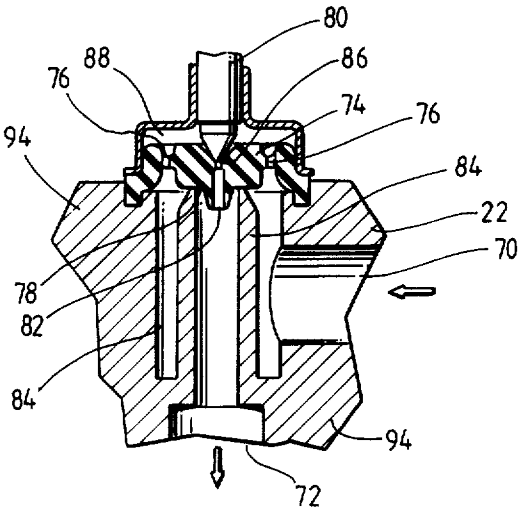
FIG. 2 is a cross-sectional view of a pilot-operated valve particularly suited for use in the system of the invention.

The action of valve 22 will now be more fully described with reference to FIGS. 2 and 3. The fluid operation of the valve is best understood by reference to the cross-sectional view provided in FIG. 2. Valve body 94 is provided with valve inlet 70 and valve outlet 72. The valve comprises diaphragm 74 which is formed of a flexible material such as rubber or neoprene and has orifices 76 and pilot valve seat 86 together with pilot valve channel 82 integrally formed therein. Pin 80 seals against pilot valve seat 86 when the valve is in its normally closed position. Solvent under pressure from inlet 70 moves through orifices 76 and into variable pressure area 88. The entire upper surface of diaphragm 74 is exposed to variable pressure area 88 while the under surface of diaphragm 74 is divided in its exposure between high pressure area 84 and the valve outlet 72 which is a relatively low pressure area. Thus when pilot valve 80 seals against the diaphragm and variable pressure area 88 assumes the pressure of the inlet due to its communication with the inlet via orifices 76, a greater surface area of the valve is exposed to high pressure than to low pressure. This pressure differential urges diaphragm 74 against valve seat 78 thereby closing the valve.

When pilot valve pin 80 is retracted in response to the action of magnet 24 to its armature (not shown), pilot valve channel 82 is opened to low pressure area 72. Inasmuch as channel 82 is significantly larger than the combined area of orifices 76, variable pressure area 88 now assumes a pressure lower than that of inlet 70. This urges diaphragm 74 upward, off of seat 78, thereby opening the valve to flow from inlet 70 to outlet 72.

Figure 3:
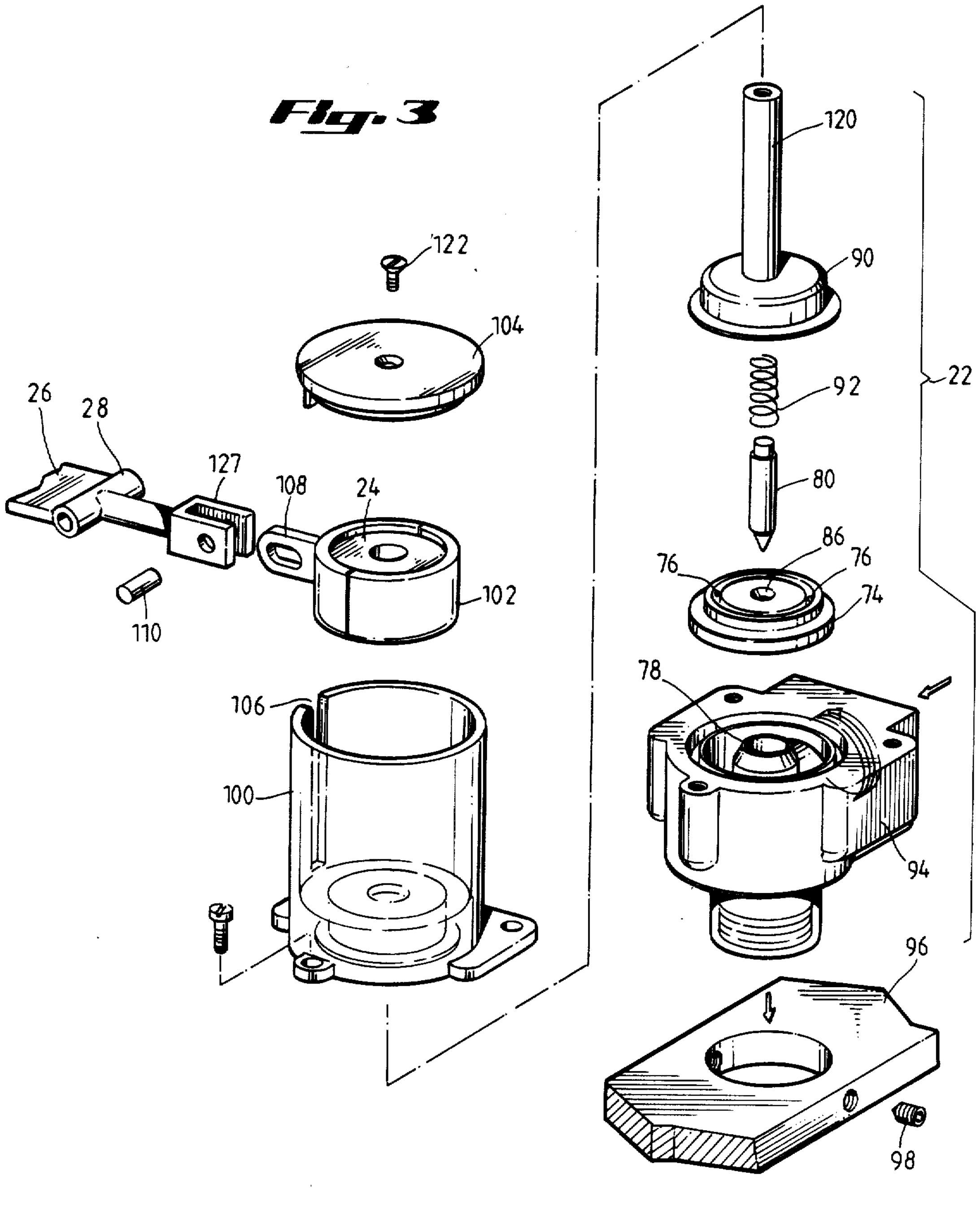
FIG. 3 is an exploded view of the valve shown in FIG. 2 together with the actuating magnet and housing therefor.

The assembly of valve 22 and its magnetic actuation can be best understood by reference to FIG. 3 which is an exploded perspective view of valve 22, actuating magnet 24, and the magnet housing 100. Valve body 94 is secured to valve support 96 by set screw 98. Valve support 96 is a part of float 14. Diaphragm 74 is secured by diaphragm housing 90 which in turn is secured to valve body 94 with magnetic guide housing 100. Pilot valve pin 80, which contains a magnetic armature, moves within hollow post 120 and is biased against the diaphragm by spring 92. Annular magnet 24 is held in magnet holder 102 which is slidably disposed within magnet guide housing 100. Magnet holder 102 includes arm 108 which projects from magnet guide housing 100 through slot 106. Arm 108 is secured by pin 110 to bracket 127 which forms one end of lever arm 26. Magnet housing cover 104 is secured to post 120 with screw 122 to close the upper end of magnet guide housing 100.

Alternatively, valve 22 may be an electrically actuated solenoid valve. In such case valve 22 could be remote from float 14 and a magnetically actuated electrical switch such as a reed switch could be placed proximate to magnet 24 and the reed switch connected via an appropriate power supply to the remote, electrically actuated valve to open and close it in response to the position of the magnet attached to level arm 26. Alternatively, a mercury-type electrical switch could be mounted on lever arm 26 so as to actuate a remote, electrically controlled solvent inlet valve in response to changes in the solution level.

It will be appreciated that the illustrated liquid detergent generator according to this invention requires no human intervention after the system is installed in a detergent shipping container and allows the automatic conversion of a relatively inexpensive solid detergent into an easily metered liquid detergent thereby providing to the user, such as a car wash operator or a dishwasher, the economies of powdered detergent and the convenience of liquid detergent.

While this invention has been illustrated and described in connection with preferred structural embodiments of the dissolving system and of particular solvents and solids, it will be appreciated that the invention is not limited thereto and that modifications will readily occur to those skilled in the art which fall within the scope of the following claims.

What is claimed is:

1. An apparatus for producing a solution of a soluble solid in a container which comprises:

- a float adapted to fit within the container without binding;
- a solvent inlet mounted on the float for admitting solvent for the soluble solid to the underside of the float;
- a solution outlet mounted on the float for withdrawing by remote means the solution on which the float is floating produced by the action of the solvent on the soluble solid;
- a sensor for sensing the distance between the upper surface of the soluble solid in the container and a point on the float which floats in the solution produced by the action of the solvent on the soluble solid;

a valve responsive to the sensor for admitting solvent through the solvent inlet from a remote supply of solvent so as to maintain between predetermined limits the distance between the float and the surface of the soluble solid in the container which is exposed to the solvent; and, fluid conduction means connecting the solvent inlet and the valve.

2. An apparatus as recited in claim 1 wherein the valve is mounted on the float.

3. An apparatus as recited in claim 1 wherein the valve is remote from the float.

4. An apparatus as recited in claim 1 wherein the solvent inlet is adapted to spray solvent against the upper surface of the soluble solid in the container.

5. An apparatus as recited in claim 1 wherein the sensor comprises a weighted footplate adapted to rest on the upper surface of the soluble solid in the container.

6. An apparatus as recited in claim 1 wherein the valve is a magnetically actuated valve.

7. An apparatus as recited in claim 1 wherein the valve is a pilot operated valve.

8. An apparatus as recited in claim 6 wherein the valve is a pilot operated valve.

9. An apparatus as recited in claim 1 wherein the valve is an electrically actuated solenoid valve.

10. An apparatus as recited in claim 1 wherein the fluid conduction means comprises flexible plastic tubing.

11. A system for dissolving a body of a solid soluble material partially filling a container, which comprises:

(a) a support member buoyant in relation to the produced solution and adapted to be positioned in the container above said body of solid material in vertically movable relation with said container;

(b) an inlet conduit carried with the support member and arranged to direct solvent toward the upper surface of said body of solid material within said container;

(c) a control valve mounted in said inlet conduit and actuable to control the flow of solvent through said inlet conduit;

(d) a sensor operable in response to level changes of said solution in said container above said body of said material to open said control valve at a first preselected level of such solution and to close said control valve at a second preselected level of such solution.

12. The system of claim 11 which further comprises an outlet conduit for said solution from said container.

13. The system of claim 12 wherein said outlet conduit is carried with said buoyant support member.

14. The system of claim 11 which further comprises a spray ring suspended below said buoyant support member and adapted to receive solvent from said inlet conduit and to spray such solvent toward the body of solid soluble material in the container.

15. The system of claim 11 wherein said control valve is magnetically actuated, and said sensor includes:

a vertically disposed rod extending through the buoyant support member;

a foot plate connected to the lower end of said rod and adapted to rest on the body of solid soluble material;

a permanent magnet positioned in actuating relation with said valve;

a lever arm pivotably supporting said magnet at one end of said lever and means on the other end of said lever responsive to vertical movements of said rod to move said magnet and thereby actuate said valve to either open or closed position.

16. A system for dissolving a body of a solid soluble material in place in a container partially filled with said material, comprising:

(a) inlet conduit means for directing solvent against the upper end surface of said body of solid materia;

(b) control valve means mounted in said inlet conduit means;

(c) valve actuator means for starting and stopping the flow of solvent against said body of solid material, said actuator means being operatively coupled to said valve means and responsive to the change in the level of said solid material resulting from the dissolution thereof by said solvent; and (d) a support member adapted to fit within said container above said material in vertically movable relation with said container, said support member being buoyant in the solution formed by said solvent of said solid material, and adapted to support said inlet conduit means, said control valve means, and said valve actuator means.

* * * * *

UNITED STATES PATENT AND TRADEMARK OFFICE

CERTIFICATE OF CORRECTION

PATENT NO. : 4,718,447

DATED : January 12, 1988

INVENTOR(S) : Ralph E. Marshall

It is certified that error appears in the above-identified patent and that said Letters Patent is hereby corrected as shown below:

Column 5, line 14, change "level" to -- lever --.

Column 6, line 34, change "level" to -- lever --.

Column 8, line 32 (line 5 in claim 16), change "materia" to -- material --.

Signed and Sealed this

Seventh Day of June, 1988

*Attest:*

DONALD J. QUIGG

*Attesting Officer*

*Commissioner of Patents and Trademarks*